(12) United States Patent
Giatilis

(10) Patent No.: US 10,694,031 B2
(45) Date of Patent: *Jun. 23, 2020

(54) METHOD OF PROVIDING A RECENT CALL LIST, SOFTWARE PRODUCT, TELECOMMUNICATIONS DEVICE AND SYSTEM

(71) Applicant: Unify Patente GmbH & Co. KG, Munich (DE)

(72) Inventor: Vasileios Giatilis, Athens (GR)

(73) Assignee: Unify Patent GmbH & Co. KG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/533,938

(22) Filed: Aug. 7, 2019

(65) Prior Publication Data

US 2019/0364149 A1 Nov. 28, 2019

Related U.S. Application Data

(63) Continuation of application No. 16/173,134, filed on Oct. 29, 2018, now Pat. No. 10,419,604, which is a (Continued)

(30) Foreign Application Priority Data

Jun. 29, 2016 (EP) .................................... 16176994

(51) Int. Cl.
H04M 1/56 (2006.01)
H04M 15/06 (2006.01)
(Continued)

(52) U.S. Cl.
CPC ..... *H04M 3/42059* (2013.01); *H04M 3/2218* (2013.01); *H04M 3/4931* (2013.01);
(Continued)

(58) Field of Classification Search
None
See application file for complete search history.

(56) References Cited

U.S. PATENT DOCUMENTS 8,001,120 B2 8/2011 Todd et al.
8,280,962 B2 10/2012 Muniz et al.
(Continued)

FOREIGN PATENT DOCUMENTS

EP 1621983 A2 2/2006
EP 1793569 A2 6/2007
(Continued)

*Primary Examiner* — Quoc D Tran
(74) *Attorney, Agent, or Firm* — Buchanan Ingersoll & Rooney PC

(57) ABSTRACT

A method of providing a recent call list of calls recently received or initiated by a telecommunications device where information on recent services which are services recently handled by or using the telecommunications device other than calls are incorporated as entries in a recent call list of the telecommunications device. Each entry can be formed by a data structure being composed of a plurality of data fields. Each data field can include a data value. An entry representing a recent service other than a call in the recent call list can include a service code identifying a recent service as a data value. A device, system, and apparatus can be configured to utilize or execute the method.

20 Claims, 5 Drawing Sheets

Related U.S. Application Data continuation of application No. 15/627,674, filed on Jun. 20, 2017, now Pat. No. 10,148,814.

(51) Int. Cl.
  *H04M 3/42* (2006.01)
  *H04M 3/493* (2006.01)
  *H04M 3/22* (2006.01)

(52) U.S. Cl.
  CPC .. *H04M 3/42314* (2013.01); *H04M 2203/551* (2013.01); *H04M 2250/60* (2013.01)

(56) References Cited

U.S. PATENT DOCUMENTS

| | | |
|---|---|---|
| 8,917,855 B1 | 12/2014 | Narayanaswamy |
| 10,148,814 B2 * | 12/2018 | Giatilis ............... H04M 3/2218 |
| 10,419,604 B2 * | 9/2019 | Giatilis ............. H04M 3/42059 |
| 2004/0137955 A1 | 7/2004 | Engstrom et al. |
| 2009/0252312 A1 | 10/2009 | Muniz et al. |
| 2012/0210253 A1 | 8/2012 | Luna et al. |
| 2013/0097546 A1 | 4/2013 | Gardenfors et al. |
| 2014/0259074 A1 | 9/2014 | Ansari et al. |
| 2015/0222744 A1 | 8/2015 | Azim et al. |
| 2017/0171726 A1 | 6/2017 | Maguire et al. |

FOREIGN PATENT DOCUMENTS

| | | |
|---|---|---|
| WO | 2008130101 A1 | 10/2008 |
| WO | 2014187288 A1 | 11/2014 |

* cited by examiner

300

354 ⟶ 358  360
302    (
304    "id": "43054",
306    "start": "2015-06-18 21:09:16",
308    "src": "497563214525",
310    "dst": "496584213842",
312    "destination": "Vas Giatilis"\"<496584213842>",
314    "duration": "6.14816",
316    "disposition": "NO ANSWER",
318    "answer": "2015-06-18 21:09:16",
320    "end": "2015-06-18 21:09:22",
322    "direction": "out",
324    "callerid": "",
326    )
                    — 356

402    {
404    "id": "43055",
406    "start": "2015-06-18 21:10:16",
408    "src": "497563214525",
410    "dst": "76103",
412    "destination": ""\"\"<Door Open>",
414    "duration": "",
416    "disposition": "Openned",
418    "answer": "",
420    "end": "2015-06-18 21:09:22",
422    "direction": "service",
424    "callerid": "",
426    **"action": "*7712"**
428    }

Fig. 4

METHOD OF PROVIDING A RECENT CALL LIST, SOFTWARE PRODUCT, TELECOMMUNICATIONS DEVICE AND SYSTEM

CROSS-REFERENCE TO RELATED APPLICATIONS

This application is a continuation application of U.S. patent application Ser. No. 16/173,134, which is a continuation of U.S. patent application Ser. No. 15/627,674, which claims priority to European Patent Application No. 16176994.8, which was filed on Jun. 29, 2016. The entirety of this European patent application is incorporated by reference herein.

FIELD OF THE INVENTION

The present invention relates to a method of providing a recent call list, and also relates to a software product, a telecommunications device and a telecommunications system.

BACKGROUND OF THE INVENTION

A telecommunication device can provide a recent call list that includes calls recently received or initiated by the telecommunications device. A recent call list is generally understood as a list including calls recently received and/or initiated using a telecommunications device, and generally allows a user to select particular entries, and initiate further calls based on such selection. The recent call list typically identifies telephone calls that were previously made by the device. In other words, a recent call list as generally known in the art is limited to showing the history of past calls.

For example, WO 2014/187288 A1 relates to a call log invoking method. A call log invoking request sent by a client comprises an action field for indicating an invoking operation and a type field for indicating that a data type is a call log. WO 2008/130101 A1 relates to providing various call services by using a hot key. EP 1 621 983 A2 relates to more easily find an item within a plurality of items of the same kind such as communications, contacts, folders, files, messages, applications, or the like, by providing a recent item list of items that were recently used. Correspondences (incoming and outgoing) may be matched to a corresponding contact stored in a device. A recent item may be shown only once in the recent items list.

SUMMARY OF THE INVENTION

A technical problem underlying the present invention is enhancing functionality of a recent call list. A further problem underlying the present invention is enhancing control of an integrated system facility management, surveillance, and monitoring by use of a telecommunications device.

The problem(s) mentioned above are at least in parts solved by the features of the appended independent claims. Further developments and advantageous embodiments of the invention are set forth in the dependent claims.

A first aspect, or embodiment, of the present invention relates to a method of providing a recent call list of calls recently received or initiated by a telecommunications device. Information on recent services which are services recently handled by or using said telecommunications device other than calls are incorporated as entries in a recent call list of said telecommunications device. Each entry of said recent call list is formed by a data structure including a plurality of data fields, wherein each data field includes a data value. An entry representing a recent service other than a call in said recent call list includes a service code identifying said recent service, as a data value. In the above aspect, recently generally means in the past. Handling of a service may include, without being limited to, initiating, controlling, monitoring, receiving reports about. A value may generally be comprised of or interpretable as any sort of character string, numeral, logical, or whatsoever, or even an array thereof. A service other than a call may be a service other than a telecommunications service at all such as door opening, facility management or surveillance, entry control, environmental surveillance, machine control, or others.

It should be understood that a call as used herein to describe embodiments of the present innovation described in this patent application can include a telephone call, but can also include other telephoning communication events such as fax, SMS (text messaging, short message service messaging, etc.) and can also include other types of telecommunications exchanges or messaging by email, skype, twitter, facebook, zing, a blog, or the like, and may include audio, video, text, or other content. A call may therefore include a telecommunications exchange involving the telecommunications device that may be defined by use of an application stored on that device and use of a service accessible via an application programming interface ("API") or other type of interface with a remote service hosted by one or more remote servers (e.g. remote computer devices having hardware including a processor, memory, and at least one transceiver type device) accessible via a network (e.g. the internet, etc.) that may be utilized via that application. A call in the sense of the application can be understood to be represented by a call identifier of another side of the call and preferably includes other contact information, in the recent call list.

In preferred embodiments, a data field may include a data field identifier identifying its respective data value (e.g. each entry may be understood as a data set wherein a place intended for a specific kind of data value is a data field which is uniquely identified by a respective data field identifier). A kind of data value may be any data in relation to a call, such as date/time, duration, other party (called, calling), direction of call (in, out, incoming, outgoing, etc.), and absolute call count in device, etc. The sum of entries may thus be provided in the form of a database or other type of datastore. As an example, the data structure may be predefined by JavaScript Object Notation (JSON), or other data exchange format. In any of such data exchange formats, the data values of each data field are information used for clearly and unambiguously identifying a call, and providing further information thereon. At least, such information allows to identify another side of the call, in particular to an extent to be able to initiate a further call with said other side. Preferably, such information also includes other aspects of a call such as date and/or time of the call. A data field identifier may be a mere field count, or be a character string including a name or shortcut of a specific kind of data value such that a data field identifier indicates a place intended for a specific kind of data value, i.e., for a specific information relating to a call. Thereby, call information may be found, interpreted and used by a call handling device or software stored in non-transitory memory of that device that is run by a processor of that device.

In preferred embodiments, said service code may be included at a place intended in said entry for a call identifier of another side of a call, and include a distinguisher allowing for distinguishing a service code from a call identifier. Said distinguisher may be a prefix or suffix, and may include a character or text not expected for a call identifier. It will be noted that each type of service may be addressed by a unique service code just like a certain other party may be addressed by a unique call identifier. It will be noted that a call identifier may include, without being limited to, any of a telephone number, a telefax number, an email address, or any other type of electronic address.

In preferred embodiments, an entry representing a recent service other than a call in said recent call list may include a plain text description of said recent service as a data value. Said plain text description may be included at a place intended in said entry for contact information of another side of a call, said contact information including at least a name and a call identifier, and be in a format expected at that place.

In preferred embodiments, an entry representing a recent service other than a call in said recent call list may include a second level detail of said recent service as a data value. Said second level detail may be included at a place intended in said entry for a second level detail of a call, and be in a format expected at that place. Second level detail of a call may for example include, without being limited to, detail of whether a call was answered, not answered, rejected, or ran into a busy terminal. Second level detail of a service other than a call may for example include, without being limited to, a result of the service.

In preferred embodiments, an entry representing a recent service other than a call in said recent call list may include a service type of said recent service as a data value. Said service type may be included at a place intended in said entry for a call type of a call, and be in a format expected at that place. A type of a call may for example include, without being limited to, detail of whether a call was outgoing or incoming.

In preferred embodiments, an entry representing a recent service other than a call in said recent call list may include follow-up service information on a follow-up service which is a service to be activated upon selection of said entry by a user, as a data value. Said follow-up service information may include a service code identifying said follow-up service.

In preferred embodiments, said recent call list may be displayed or displayable upon user choice on a display device, and if an entry representing a recent service other than a call is found in said recent call list, at least one of the service code of said recent service, and a plain text description assigned to said service code, is displayed for such entry in displaying said recent call list. In other words, just data fields which are used for displaying call details are also used to display contents of a recent service other than a call. The appearance in a displayed recent call list would be quite the same format for recent calls and recent services other than calls.

In preferred embodiments, said recent call list is sorted or sortable upon user choice by at least one of a date, call identifier of another side of a call, name and/or other contact information, and service code.

In preferred embodiments, said entries regarding one same service functionality are grouped or groupable together upon user choice in said recent call list. In preferred embodiments, said telecommunications device may be a telecommunications terminal device. Said recent service and/or a follow-up service may be executed or executable by a telecommunications server such as a PBX or the like. As an alternative or additional option, remote services may address or be addressable by a telecommunications server such as a private branch exchange (PBX) of telecommunication switch device via a local area network (LAN) or a wide area network (WAN). Such networks may be wireless, wired, or include transmission paths that include both wired and wireless transmission paths involving a plurality of intermediate nodes (e.g. gateways, base stations, access points, routers, etc.).

In preferred embodiments, a data structure may be provided comprising assignments of service codes and additional information for identifying and/or describing a service or kind of service. Said additional information may comprise at least one of a plain text description, service type, service code of a follow-up service. Said data structure may be provided in the form of a database, table, or the like.

A second aspect, or embodiment, of the present invention relates to a software product for providing a recent call list of calls incoming to and outgoing from a telecommunications device, said software product being stored on a non-transitory computer-readable medium, preferably being directly loadable into an internal memory of a computer. The software product of this aspect comprises program code for performing the steps of the method of the afore-described first aspect of the present invention at said telecommunications device when said software product is executed by said computer. Said computer may be embodied by said telecommunications device or a server connected to said telecommunications device. It will be noted that the software product may be embodied by, without being limited to, a stand-alone software, software package, plug-in, add-on, app or the like to be included in or used by or co-executed with or enabling or enhancing functions of a telecommunications software, or may constitute or be part of or include a basic operating program of a telecommunications device, unit, server, system, or the like.

A third aspect, or embodiment, of the present invention relates to a telecommunications device, preferably a telecommunications terminal device (e.g. a computer, a desktop computer, a personal computer, a laptop computer, a telephone, a smart phone, an electronic tablet device, televisions, or other type of endpoint device having hardware that includes non-transitory memory (e.g. flash memory, a hard drive, etc.), a processor (e.g. a central processing unit, a microprocessor, etc.) configured for use by a user to initial calls and/or receive calls for engaging in telecommunications activities with others, and at least one transceiver unit (e.g. at least one receiver and at least one transmitter). The telecommunications device of this aspect is adapted to execute the method of the afore-described first aspect of the present invention. Adaptation may be provided by implementing the program code of the software product of the afore-described second aspect of the present invention. It will be noted that the telecommunications terminal device in some embodiments may be any kind of device suitable to perform telecommunication events, such as a mobile phone, smart phone, portable computer, desktop computer, a telecommunications server such as a PBX, or the like.

A fourth aspect, or embodiment, of the present invention relates to a telecommunications system comprising at least one telecommunications device, preferably at least one telecommunications terminal device. The telecommunications system of this aspect is adapted to execute the method of the afore-described first aspect of the present invention. Adaptation may be provided by implementing the program code of the software product of the afore-described second aspect of the present invention on at least one instance included in said telecommunications system. The telecommunications system may comprise at least one server for executing services other than telecommunications services. The server may be or included in or comprise a PBX. Said services other than telecommunications services may include at least one of a door opening service, door monitoring service, facility management service, surveillance or monitoring services, or the like. The telecommunications system may further comprise at least one of a telecommunications server for executing telecommunications services. It will be noted that the server and the telecommunications server may be, but need not to be, the same device.

Embodiments (or aspects) of the present invention may as well be embodied by a computer program including instructions configured for storage within memory of a device to cause that device to o perform the steps of the afore-described method of the first aspect when said computer program is loaded in or executed by said device, or by a digital data carrier having electrically readyble control signals which are designed to operate with a programmable device, said control signal being designed and adapted to cause the device to perform the steps of the method of the afore-described first aspect of the present invention. In any such cases, the device may also be embodied by the telecommunications device of the afore-described third aspect.

With embodiments of the present invention, a concept is introduced that services activated or addressed via service codes can be incorporated within a recent call list so that such services appear just like telephone calls in the call history. In other words, the functionality of a well-known recent call list is enhanced in that it may be understood as a recent-calls- and -services history, and each service event appearing as an entry in the history may be selected just as a call so as to inspect its details, or activate some follow-up service which may be predefined or suggested as part of the same entry of the recent call list. This also enhances control of an integrated system facility management, surveillance, and monitoring by use of a telecommunications device.

Further aspects (or embodiments), objects, advantages, and details of the present invention will become more apparent from the following description of specific exemplary embodiments of the invention and respective illustration thereof in the appended drawings.

BRIEF DESCRIPTION OF THE DRAWINGS

Exemplary embodiments of a software product stored in non-transitory memory, a telecommunications device, and a telecommunications system, and methods of making and using the same are shown in the drawings included herewith. It should be understood that like reference numbers used in the drawings may identify like components.

FIG. 3 shows a flowchart of a process in a method according to an exemplary embodiment of the present invention.

FIG. 4 shows a flowchart of another process in a method according to an exemplary embodiment of the present invention.

Figure 1:
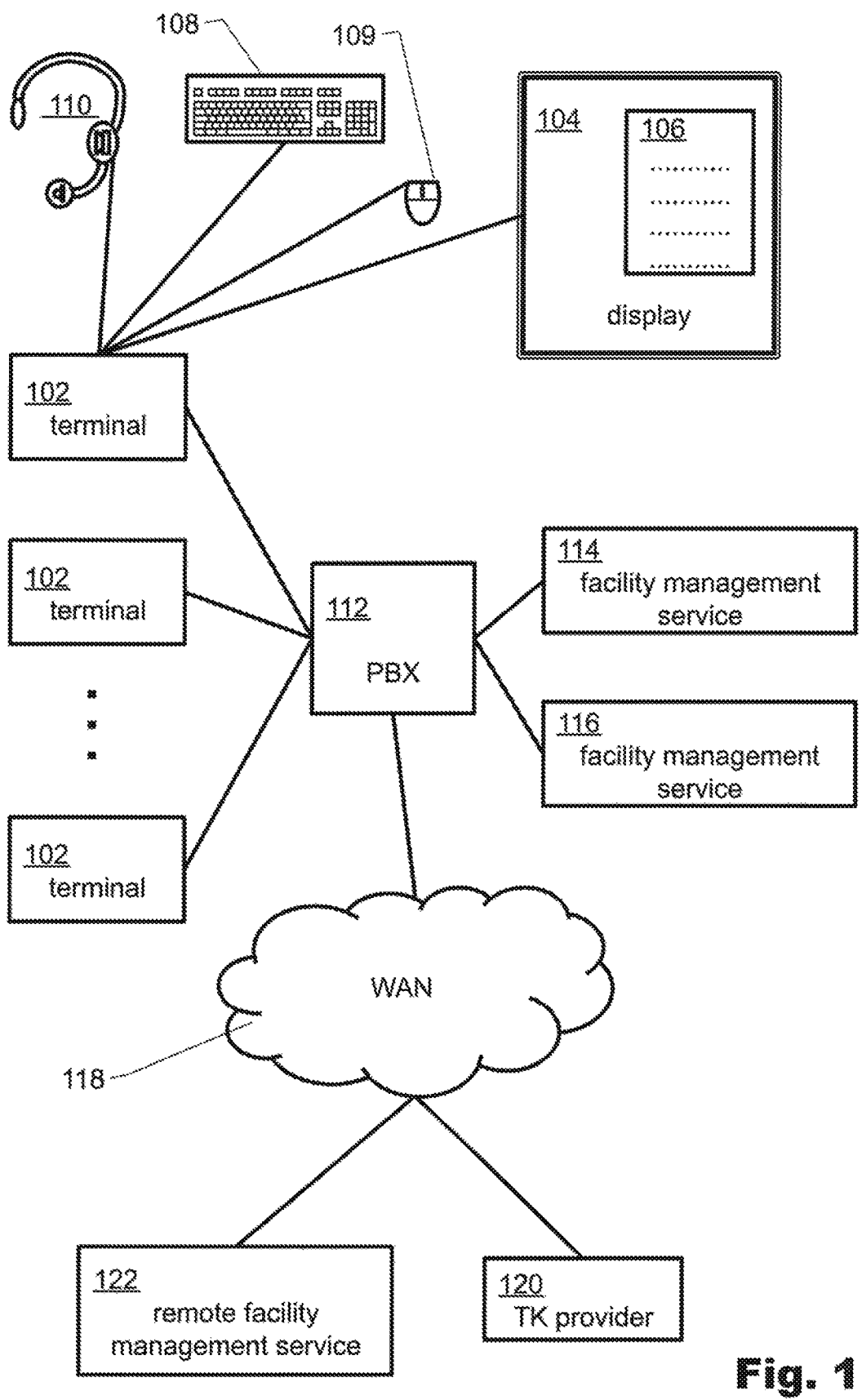
FIG. 1 shows a general example of a telecommunications environment including a telecommunications system and a telecommunications device according to an exemplary embodiment of the present invention.

Next, the invention will be described with reference to specific exemplary embodiments in view of the appended drawings. It will be noted however that the illustrations in the drawings are purely schematic, need not to be to scale, and may be limited to features that are believed to be useful for a person of skill in the art to understand principles that may be incorporated into embodiments of the present invention.

DETAILED DESCRIPTION OF EXEMPLARY EMBODIMENTS

FIG. 1 shows a general example of a telecommunications environment 100 according to an exemplary embodiment of the present invention.

As shown in FIG. 1, the telecommunications system includes a number of communications terminal devices 102. Each terminal device 102 may in general be understood as a computer device that includes a CPU, ROM, RAM, internal and/or external busses, interfaces and controllers, power supply etc. and is connected to (or includes) a display unit 104 for displaying contents as results of software running on terminal device 102. For instance, software stored in non-transitory memory can be executed by a processor of the terminal device 102 such that the device performs a method defined by the code of the software. Graphical user interface information can be displayed based on such software via the display unit to facilitate displaying of output to a user and receipt of input from a user utilizing one or more input devices of the terminal device (e.g. touch screen feature of the display unit 104, stylus, button, keypad, keyboard, pointer device, mouse, etc.).

In the present example, a recent call list 106 is displayed on display unit 104 of one of the terminal devices 102. Each terminal device 102 may also be connected to (or include) I/O facilities such as a writing unit 108 such as a keyboard, a pointing unit 109 such as a mouse, and a voice unit 110 such as a head set. Terminal devices 102 are connected to a PBX 112 directly or via a local area network (not explicitly shown), or implemented in PBX 112.

Moreover, a door opening service 114 and a facility management service 116 are connected to a PBX 112 directly or via the local area network, or implemented in PBX 112. PBX 112 is connected or connectable to a wide area network (WAN) 118 such as the Internet or the like. For connecting to WAN 118, PBX 112 may be assumed to be connected to or include some routing/gateway facility (not explicitly shown) which may also manage the local area network mentioned above. Via WAN 118, PBX 112 is further connected to a telecommunications provider 120 and a remote facility management system 122. The terminals 102 and the PBX 112 may be understood as a telecommunications system in the sense of the present invention.

Figure 2:
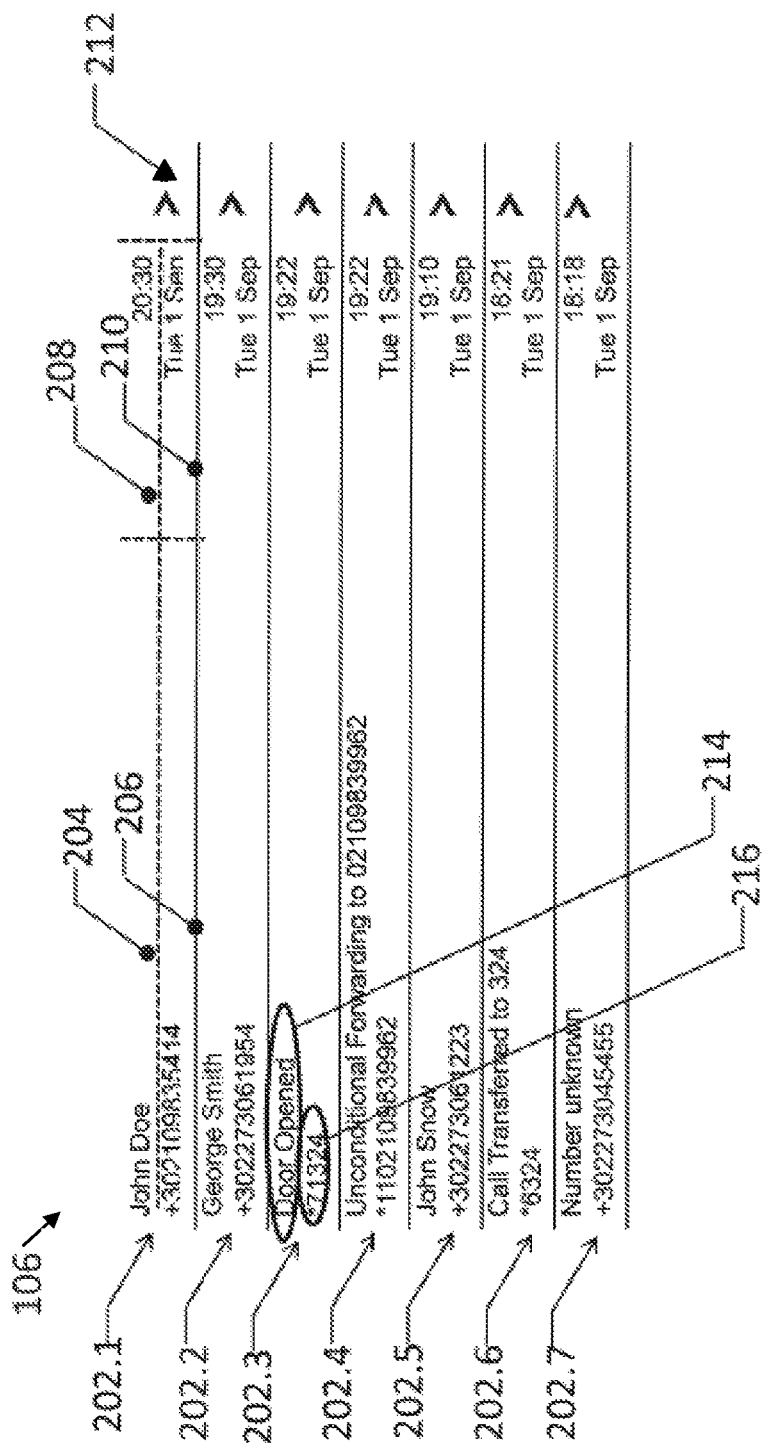
FIG. 2 shows an excerpt of a recent call list provided by a method according to an exemplary embodiment of the present invention as showing up on a display of a telecommunications device.

FIG. 2 shows an excerpt of recent call list 106 as it shows up on display 104 of a telecommunications device 102 used by a user (see FIG. 1), including typical examples of the features introduced according to the present invention. The recent call list 106 includes a number of entries which will be generally addressed by reference sign 202, in the following. In the excerpt showing up in FIG. 2 seven individual entries 202.1, . . . , 202.7 are visible of which entries 202.1, 201.2, 202.5 and 202.7 relate to recent calls, entries 202.4 and 202.6 relate to telecommunication services other than telephone calls, and entry 202.3 relates to a service other than a telecommunication service (and, obviously, other than a telephone call).

Each entry 202 displayed in the excerpt of the recent call list 106 is divided into several display areas as exemplarily indicated by dotted border lines in the first entry 202.1, including a name area 204, a number area 206, a date area 208, a time area 210, and a selection area 212. If an entry relates to a call such as, e.g., entry 202.1, 202.2 and others, the name area 204 shows a name of a person (or more generally, of a party which also may be a company, society or whatever entity) to which or from which the call was directed, the number area 206 shows a number (or more generally, a party identifier) of the party to which or from which the call was directed, the date and time areas 208, 210 show a date and time of when the call was made or received, and selection area 212 includes some selection symbol which is selectable by, e.g., pointing unit 109 of FIG. 1. If an entry relates to a service other than a call as exemplified by entry 202.3, the name area 204 shows a short description 214 of the service, the number area 206 shows a service code 216, and the date and time areas 208, 210 show a date and time when the service event has happened. In any case, selecting the section symbol in selection area 212 leads to a further action associated with the entry, such as showing its details or executing some follow-up service being prescribed by default or varying depending on a situation, or being selectable by user choice.

As shown in FIG. 2, a service code 216 showing up in the number area 204 of entries 202.3, 202.4 and 202.6 has a format clearly showing that the number is not a telephone number or other call identifier. In the present example, a service code is prefixed by a "*" character (asterisk sign). It will be noted that the invention is not limited to a "*" prefix for this purpose.

The excerpt of recent call list 106 shown in FIG. 2 is sorted by date and time such that the most recent entry shows up first. However, there is no limitation in this regard. In particular, the list may be generated as a pure data structure, each entry identified by some entry identifier or count not showing up when displayed, and may be sorted by any other criteria automatically, by default, or upon user choice for display.

The concept of introducing service codes 216 inside recent call list 106 opens a new view in presenting recent calls in telephone systems (herein, an entry of a recent call list may also be addressed as a "recent", for ease of language). This can enable users to see their activated features such as opening a door, forwarding a call, transferring a call, granting access to a user to reach an outside line, parking a call etc. In that essence, recents become a more common history of exactly what a user has done with his or her device.

In the following, an approach on the method of how service codes of any kind can be incorporated in recents of a recent call list so a user can handle them in the same way as recent calls, will be described. This description is oriented for showing the different attributes that can be deducted from such an approach:

showing the service codes and translating to the actual code listing up the history;
what happens when the user selects a recent entry that in fact is a service other than a call or, more generally, other than a telecommunication service; and
how service codes can be grouped depending on type.

<Showing Services Codes in Recents>

First of all, an exemplary principle data structure of an entry in recent call list 106 will be described by way of example. FIG. 3 shows a data structure 300 representing a recent call list entry 106 as shown in FIG. 1. The data structure 300 may be understood as a listing in JSON format. An overview of the JSON data interchange format may be found in "The JSON Data Interchange Format", Standard ECMA-404, $1_{st}$ Edition/October 2013, ecma international, with further references. The listing in FIG. 3 includes a JSON response showing how a recent call entry 106 may be represented in an PBX system. It will be noted however that JSON is just one example of a data structure to describe the way data is received. Other forms may apply as well. The JSON format is used, for example, in Asterisk which is a common telephone system. Of course, the present invention is not limited to this application.

In JSON as in many other data interchange formats, a data structure (which may also be referred to as a data set or object) may be listed in text form which is written in lines. In the present example as shown in FIG. 3, the data structure 300 includes lines 302-326 counted in even numbers. The first and last lines 302, 326 include an opening token 354 and a closing token 356, respectively (here, left and right curly brackets) while lines 304-324 include respective data fields 352. It will be noted that data fields 352 are separated from each other by a data field separator (here, a comma). Each data field 352 is composed of a data field identifier 358 (the "name" of the data field) and a data value 360. Data field identifiers 358 and data values 360 are character strings (words) framed by quotation signs (double inverted commas). A data filed identifier 358 is followed by a data value 360, separated by a separator (colons). If a data value 360 includes more than one item such as for the destination field in line 312, the items are separated from each other by another separator (backslash). It will be noted that listing in lines is only for the human reader for ease of recognition but is not necessary for automatic interpretation of the data structure 300. In the following, a specific one of data fields 352 may also be referred to by its line count within the data structure 300.

As seen in FIG. 3, a JSON response of a recent call may include the data fields shown in table 1 below:

TABLE 1

Data fields in recent call entry

| IDENTIFIER | CONTENT |
|---|---|
| id | object identifier (call count) |
| start | starting date and time of call (predefined date and time format) |
| src | source of call (number only) |
| dst | destination of call (number only) |
| destination | destination of call (name and number) |
| duration | duration of call (time information on duration of call, etc. (date of call and time indicating entirety of the duration of the call, etc.) |
| disposition | ANSWERED, NO ANSWER, BUSY, or other disposition identifier |
| answer | date and time of answering the call |
| end | date and time of end of the call |
| direction | direction of the call (in; out, etc.) |
| callerid | call identification (e.g. caller ID, etc.) |

It is noted however that the above identifiers and contents are exemplary and may be defined as needed in a telecommunications device, system, or software, and even by a user.

To include recent services other than calls in a recent call list, service codes can be incorporated in a recent call entry. A table which matches the service code activated with the actual service code can write in the recents the actual service in text mode. Recent's date and time are the same as any other recent call.

FIG. 4 shows an example of a data structure 400 representing a recent call list entry 106 referring to a recent service other than a call, in a recent call list. This data structure 400 includes lines 402-428 where lines 404-426 include data fields and lines 402, 428 include opening and closing tokens, respectively. For further details on the data structure 400 which is similar to data structure 300 of FIG. 3, see the afore description. In this data structure 400, the fields "dst" (line 410), "destination" (line 412), "disposition" (line 416), and "direction" (line 422) have been re-used for including content relating to the recent service, and a new data field "action" is included in line 426. The "action" field 426 may be understood as a user-defined data field. Below table 2 includes how data fields match with a service code entry.

TABLE 2

Matching of data fields in recent service entries

| IDENTIFIER | CONTENT FOR RECENT SERVICE |
| --- | --- |
| dst | The actual service code activated from user at the "start time" |
| destination | The service code in text mode as it is obtained by the database |
| disposition | Second level details from the service action |
| direction | The actual type of the entry ("service") |
| action | Further action on selecting an entry |

In the "direction" field 422 an application can decide if this entry is a service code or an actual call and it can handle the information likewise.

All other fields remain the same as in recent calls. So even an application that does not distinguish the difference between call and service will show this information irrespectively of the content.

In the listing of data structure 400 shown in FIG. 4, the number in the "src" field is the number of a user of the terminal device where the recent call list is provided, and the service code of a service initiated using this device is found in the "dst" field. However, it can be vice versa such that in case that the service is initiated by another side the service code is found in the "src" field, and the own number is found in the "dst" field in such case.

Figure 5:
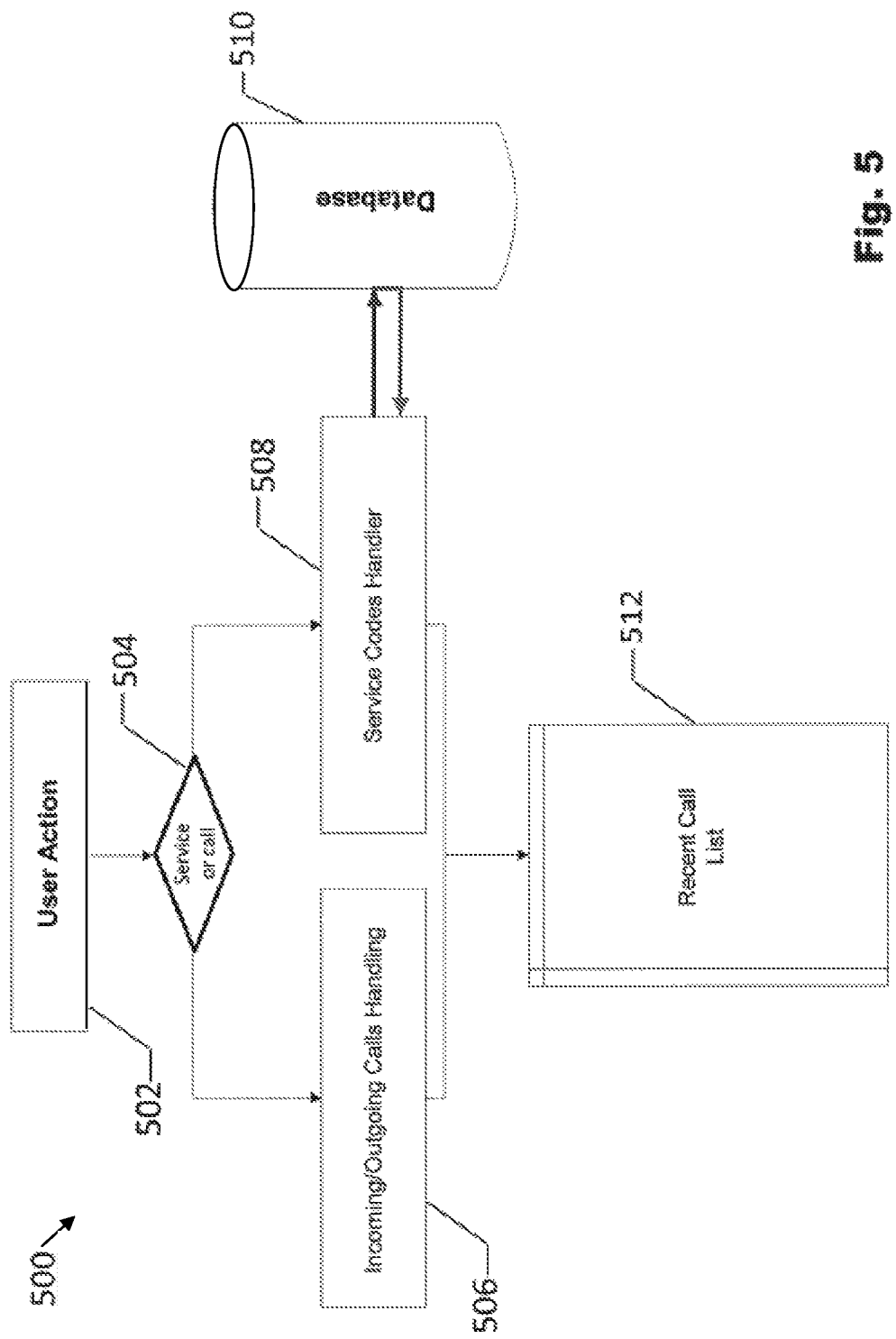
FIG. 5 shows an example of an recent call entry of a recent call list provided by a method according to an exemplary embodiment of the present invention.

FIG. 5 shows a flowchart of a process 500 of matching incorporating service codes in recent call list. As shown in FIG. 5, process 500 starts by recognizing a user action in step 502. Then, in step 504, a judgment is made as to whether a call or a service was included in the user action recognized in step 502. If the judgment 504 leads to a call, an incoming/outgoing call handling is made in step 506. If the judgment 504 leads to a service other than a call, a service code handling is made in step 508 which implies data exchange with a database 510. Thereafter, the branches via steps 506, 508 are reunited, and a recent call list is provided in step 512.

<Service Code Selection>

When selecting a recent call either details are displayed or the selected number is called back. Similarly these two options will be applied when a service other than a call is selected. In case details are to be shown all information is obtained from the response. This is up to the application how to handle this information. It will be noted that selection of an entry may be done by touching a screen area (e.g., selection area 212 in FIG. 2), pushing or pressing a key, expressing speech or gesture or whatever input option the employed terminal device may offer. In case user selects an entry of a recent service other than a call then not all same rules do apply as in the case of recent call. The differentiation is due to the fact that a dialing the same service code combination is not necessarily the same action required for all cases.

For example, a user selects a feature code to open a door via use of an input device for providing the selection. This entry is registered as an open door action. When user selects this entry in the recent call list, then it makes little sense if the door opens again. It would make sense if the user watches the door from a video monitor or opens the speaker call of the door etc. The above example shows the necessity to define an additional field namely the "action" field shown in FIG. 4 that can define another action (so-called follow-up action) from the one additionally registered. The information of whether a different action is necessary is held in a local database of the underlined communication system.

Figure 6:
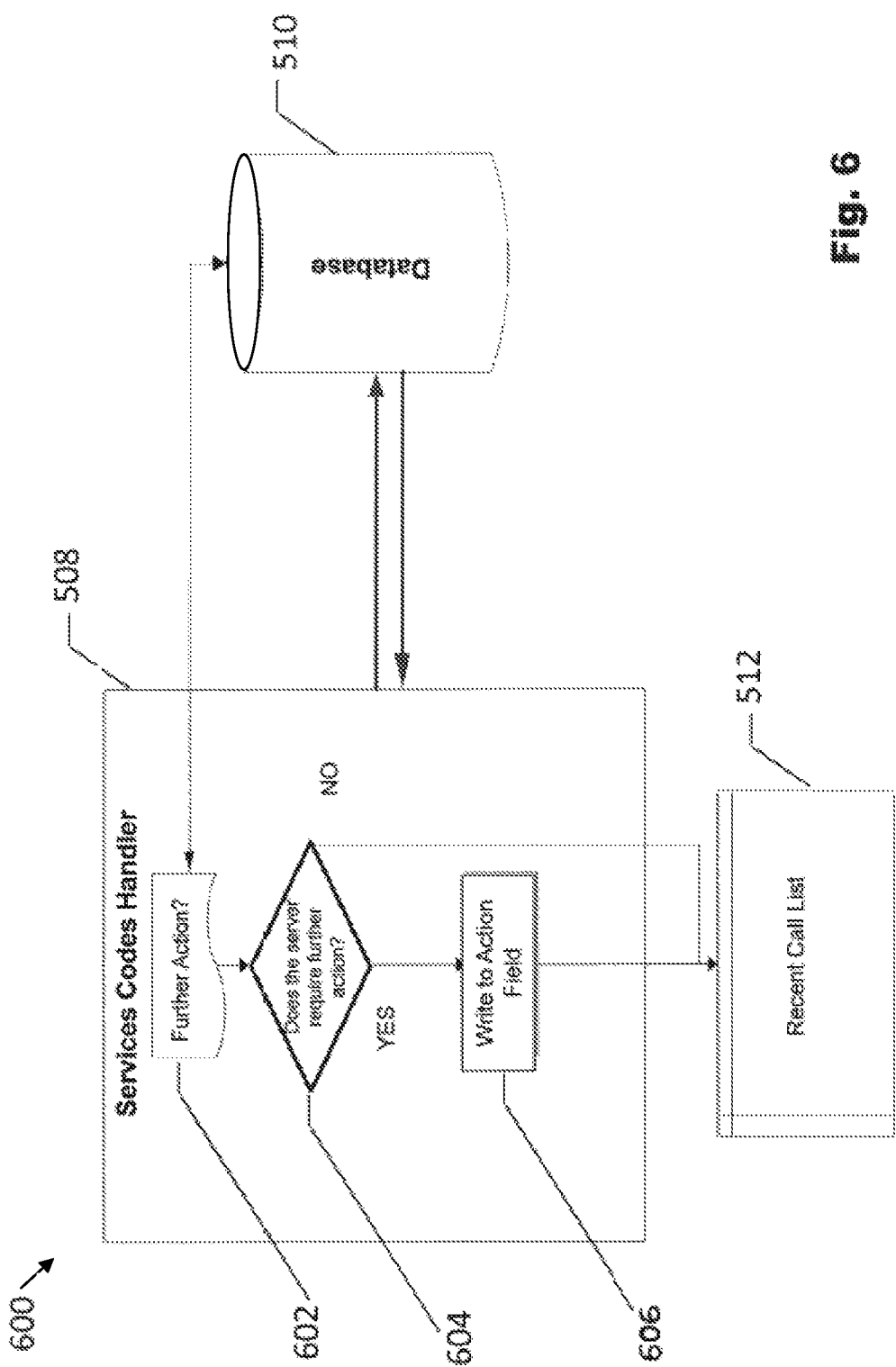
FIG. 6 shows an example of an recent service entry of a recent call list provided by a method according to an exemplary embodiment of the present invention.

FIG. 6 shows a flowchart of a process 600 on writing onto the "Action" field. The flowchart is an excerpt relating to steps 508 and 512 of process 500 shown in FIG. 5 and analyzes in more detail one of the functions of service codes handler step 508, as indicated by steps 602, 604, and 606 which are part of service code handler step 508.

<Grouping Service Codes>

One additional functionality that can be provided is the grouping of consecutive service codes. Again in this case this functionality differs from the one of the consecutive calls. Taking as example the door opener feature there are many times that service codes might differ for the same functionality. For example, service code may contain a secret key. Different users can open the door with different keys from the same device. In that case the recent call list will differentiate the two service codes for the same function and will list up two different entries. Hence the field "destination" may become very important since this is the one that can generically provide the information of the actual feature code. In this point it is to be made clear that "destination" and "dst" are two levels of decision given in the application which can be used openly. In other words, is up to the application whether it would use the information provided from the JSON listing, since the latter's content could be taken as redundant information.

The invention has been described above based on specific exemplary embodiments, and variations and modifications thereof. Obviously, any features, objects, advantages, and details of any specific exemplary embodiment, its variations and modifications apply to any other embodiment, variation or modification mutatis mutandis unless such application obviously violates technical constraints or laws of nature. Embodiments, variations and modifications may be combined with any other embodiment, variation or modification, and any combination as a whole or in terms of single feature may be assumed to constitute an embodiment of the invention.

It should be understood that while certain exemplary embodiments of the ZZZ methods of making and using the same have been shown and described above, it is to be distinctly understood that the invention is not limited thereto but may be otherwise variously embodied and practiced within the scope of the following claims.

What is claimed is:

1. A telecommunications apparatus comprising:
at least one telecommunications device communicatively connectable to at least one server for executing services, the at least one telecommunications device having a processor and a non-transitory computer readable medium;
the at least one telecommunications device configured to incorporate information on recent services as entries in a recent call list of said telecommunications device, wherein each entry is defined by a data structure, wherein the recent call list comprises at least one non-telecommunications service entry representing a recent service other than a telephone call in said recent call list, each at least one non-telephone call service entry comprising: a service code identifying a non-telephone call service as a data value such that the service code or an identifier associated with the service code is displayable when the recent call list is displayed regardless of whether differences between telecommunication calls and non-telecommunication services are distinguishable by the telecommunications device; and
the at least one telecommunications device configured to display at least one follow-up action option associated with the service code in response to a selection of at least one of the non-telephone call service entry of the recent call list.

2. The telecommunications apparatus of claim 1, comprising:
the server, the server having at least one processor connected to a non-transitory computer readable medium.

3. The telecommunication apparatus of claim 2, wherein the server is communicatively connected to the telecommunications device via at least one network.

4. The telecommunications apparatus of claim 1, wherein the at least one non-telephone call service entry comprises at least one entry from a door opening service, a door monitoring service, a facility management service, and/or a surveillance service.

5. The telecommunications apparatus of claim 1, wherein the identifier associated with the service code is displayable via the telecommunications device so that the identifier is included at a place for a call identifier of another side of a telephone call, and said service code includes a distinguisher that distinguishes the identifier from a call identifier so that the identifier is displayable regardless of whether differences between telecommunication calls and non-telecommunication services are distinguishable by the telecommunications device.

6. The telecommunications apparatus of claim 5, wherein said distinguisher is a prefix of the service code or a suffix of the service code.

7. The telecommunications apparatus of claim 1, wherein a data structure comprising assignments of service codes and additional information comprising a description of a non-telecommunications service associated with each of the service codes, said data structure being stored in the non-transitory computer readable medium so that the data structure is accessible to the telecommunications device.

8. The telecommunications apparatus of claim 6, wherein the identifier associated with the service code is displayable via the telecommunications device based on the description.

9. The telecommunications apparatus of claim 1, wherein the identifier includes a plain text description of said recent service as a data value.

10. The telecommunications apparatus of claim 9, wherein the plain text description is displayable at a place intended in said entry for contact information of another side of a telephone call, said contact information including at least one of a name, a telephone number, a telefax number, an email address, or any other electronic address, and is in a format expected at that place.

11. The telecommunications apparatus of claim 1, wherein the at least one non-telephone call service entry in said recent call list includes a second level detail as a data value, wherein said second level detail is displayable at a place intended for a second level detail of a telephone call, and is in a format expected at that place.

12. The telecommunications apparatus of claim 1, wherein the identifier of the at least one non-telephone call service entry is displayable in said recent call list so that the identifier is displayed at a place intended for a call type of a telephone call, and is in a format expected at that place.

13. A method of providing a recent call list of calls recently received or initiated by a telecommunications device, the telecommunications device comprising a processor connected to a non-transitory computer readable medium, the method comprising:
incorporating information on recent services other than telephone calls as entries in a recent call list of said telecommunications device, wherein each entry is defined by a data structure comprised of a plurality of data fields, each data field including a data value, and wherein the recent call list comprises at least one non-telephone call service entry representing a recent service other than a telephone call service in said recent call list, each at least one non-telephone call service entry comprising: an identifier associated with a service code identifying a non-telephone call service and/or the service code;
displaying the recent call list having the at least one non-telephone call service entry via the telecommunications device so that that identifier is displayed in the recent call list;
in response to a selection of at least one non-telephone call service entry from the displayed recent call list, said telecommunications device displaying at least one follow-up action option associated with the service code.

14. The method of claim 13, wherein said service code and the identifier are displayed so that the service code and the identifier are displayed in the recent call list at a place intended for a call identifier of another side of a call, and said service code includes a distinguisher that distinguishes the service code from a telephone call identifier.

15. The method of claim 14, wherein said distinguisher is a prefix or a suffix.

16. The method of claim 13, comprising:
storing an assignment data structure in the telecommunication device, the assignment data structure comprising assignments of service codes and additional information comprising a description of a non-telephone call service associated with each of the service codes, the identifier being based on the description.

17. The method of claim 13, wherein the identifier is displayed so that the identifier is included at a place intended in said entry for contact information of another side of a telephone call, said contact information including at least one of a name, a telephone number, a telefax number, an email address, or any other electronic address, and is in a format expected at that place.

18. The method of claim 13, comprising:
displaying the recent call list via a display such that the at least one non-telephone call service entry is displayed so that the identifier associated with the service code is displayed via the display.

19. The method of claim 13, comprising:
sorting said recent call list by at least one of a date, a call identifier of another side of a telephone call, and service code.

20. A non-transitory computer readable medium having a software product for providing a recent call list of calls incoming to and outgoing from a telecommunications device stored therein, said software product comprising program code for performing the steps of a method that is executed by the telecommunications device when the telecommunications device runs the code, the method comprising:
incorporating information on recent services other than telephone calls as entries in a recent call list of said telecommunications device, the recent call list comprising at least one non-telephone call service entry representing a recent service other than a telephone call service in said recent call list, each non-telephone call service entry comprising: an identifier associated with a service code for a non-telephone call service and/or the service code;
displaying the recent call list having the at least one non-telephone call service entry via the telecommunications device; and
in response to a selection of at least one non-telephone call service entry from the displayed recent call list, displaying at least one follow-up action option associated with the service code.

* * * * *